Oct. 10, 1944.   J. S. TROYER   2,360,022
SPIKE TOOTHED HARROW
Filed Oct. 12, 1942
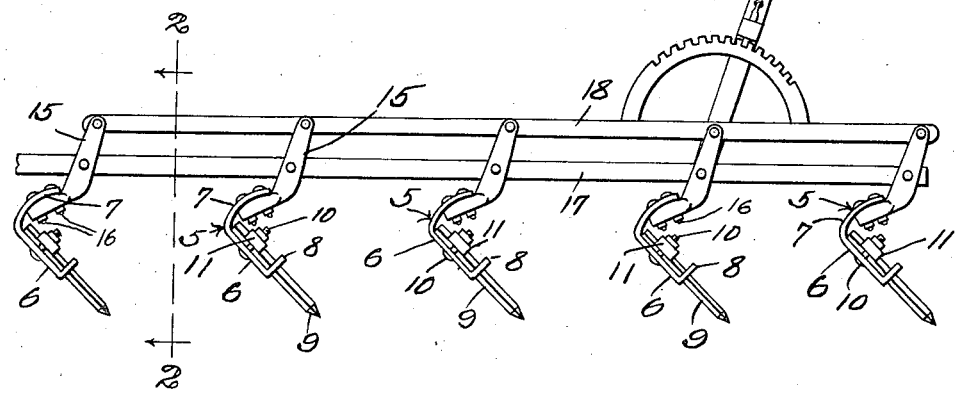
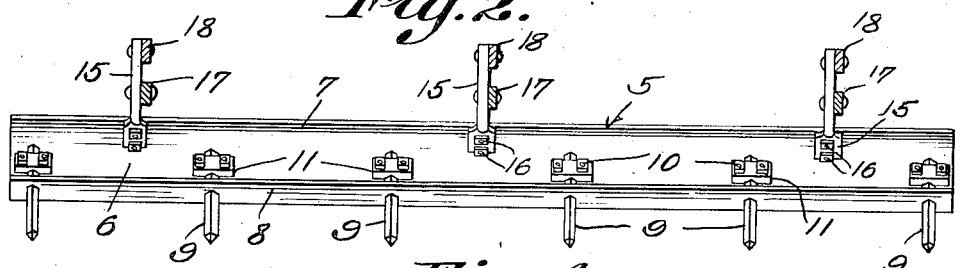
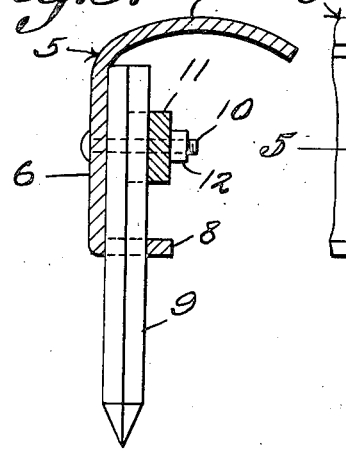 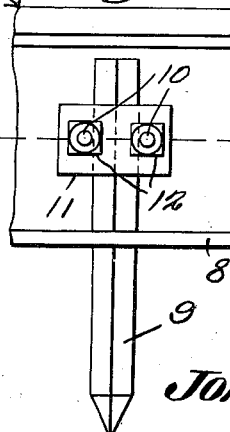 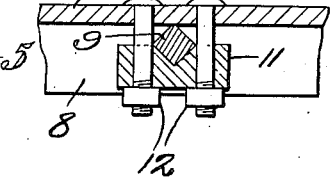
John S. Troyer
INVENTOR.

Patented Oct. 10, 1944

2,360,022

UNITED STATES PATENT OFFICE 2,360,022

SPIKE TOOTHED HARROW

John S. Troyer, Hickory, Va.

Application October 12, 1942, Serial No. 461,743

2 Claims. (Cl. 55—103)

The present invention relates to spike toothed harrows, the primary object of the invention being to provide a harrow of this character including substantially wide tooth bars transversely curved to provide guards, which will protect the upper ends of the spikes or teeth of the harrow against weeds, grass or other foreign material collecting thereon, thereby providing a self-cleaning harrow which is exceptionally useful as a weeder in weeding fields of growing crops.

Another important object of the invention is to provide wide toothed bars, curved in such a way as to prevent the collection of material over the upper ends of the teeth of the harrow, even when the teeth have been moved to operate at oblique angles with respect to the ground surface over which the harrow is moving.

Still another object of the invention is to provide toothed bars which will operate as runners on which the harrow is supported, when the harrow is being moved from one place to another.

Still another important object of the invention is to secure the teeth of the harrow to the tooth bars in such a way that the teeth will be securely held in position against displacement while in operation.

With the foregoing and other objects in view, which will appear as the description proceeds, the invention resides in the combination and arrangement of parts and in the details of construction hereinafter described and claimed, it being understood that changes in the precise embodiment of the invention herein described, may be made within the scope of what is claimed, without departing from the spirit of the invention.

Referring to the drawing:

Figure 1 is a side elevational view of a toothed harrow constructed in accordance with the invention.

Figure 2 is a sectional view taken on line 2—2 of Figure 1.

Figure 3 is a vertical sectional view through a tooth bar of the harrow.

Figure 4 is a rear elevational view of the tooth bar illustrating a spike tooth as secured thereto.

Figure 5 is a sectional view taken on line 5—5 of Figure 4.

Referring to the drawing in detail the harrow embodies a plurality of spike tooth bars 5 arranged in parallel spaced relation with respect to each other, the tooth bars being constructed of lengths of wide sheet metal material bent intermediate their longitudinal edges, providing a straight portion 6, and a curved flange 7, the curved portions extending throughout the lengths of the bars, as clearly shown by the drawing.

The opposite edges of the toothed bars are extended at right angles providing flanges 8 which are formed with openings to accommodate the spike teeth 9 which together with the securing means, to be hereinafter more fully described, firmly secure the teeth in position.

The tooth securing means embodies bolts 10 which extend through the straight portions of the tooth bars, the bolts being arranged in spaced relation with respect to each other, so that the teeth of the harrow will contact the adjacent edges of the bolts, as clearly shown by Figure 5. These bolts 10 are of lengths to extend appreciable distances within the bars 5, where they pass through openings in the securing blocks 11, which are formed with cutout portions to accommodate the teeth. The nuts 12 which are positioned on the bolts 10 act to draw the securing blocks into close engagement with the spike teeth and set up a binding action with the straight portions of the tooth bars.

Due to the construction of the tooth bars, it will be seen that only the pointed ends of the teeth are exposed, the upper ends of the teeth being completely housed by the curved flanges 7 of the tooth bars. These curved portions 7 present surfaces which will glide over irregularities in the surface over which the harrow is being moved from one field to another. These curved surfaces also prevent weeds and foreign material from collecting on the upper ends of the teeth of the harrow, which would otherwise tend to clog the teeth and damage growing crops, when the harrow is used in weeding fields of growing plants.

It will of course be understood that the curved flanges 7 of the tooth bars, afford means whereby the connecting arms 15 may be secured thereto, the connecting arms being bolted to the inner curved surfaces of the flanges 7, as clearly shown by Figure 1 of the drawing. The bolts 16 which are used in connecting the arms 15 to the tooth bars, are extended through the curved portions of the tooth bars and arms 15, the heads of the bolts being exposed to the front of the harrow, the heads being rounded so that no abrupt surfaces are presented which would collect foreign material and act to retard the movement of the harrow.

The arms 15 are pivotally connected to the bars 17 that form a supporting frame and are arranged in transverse spaced relation with respect to each other across the tooth bars 5, the bars 17 being connected to the arms 15, at points spaced from the upper ends of the arms 15. Operating in conjunction with the bars 17, are bars 18 that have pivotal connection with the arms 15 at their upper ends. It will of course be understood that these bars operate in the usual and well known manner, to adjust the angle of the teeth 9 for regulating the depth of operation of the teeth, and adapting the harrow for a particular work.

The usual control lever 19 is connected with the harrow, so that the operator may by moving the lever forwardly or rearwardly, accomplish the adjustment of the teeth of the harrow.

From the foregoing it will be seen that due to the construction shown and described, the pointed ends of the spike teeth, are the only portions of the teeth which extend below the tooth bars, the upper ends of the teeth being completely housed or guarded by the curved portions of the tooth bars, thereby insuring against weeds, trash or other foreign material, collecting on the teeth to retard the movements of the harrow and damage growing crops, when the harrow is used in cultivating fields.

It will also be seen that by moving the teeth to a substantially horizontal position, the tooth bars act as runners on which the harrow may be readily transported from place to place, the curved flanges 7 of the bars moving over irregularities on the surface.

What is claimed is:

1. In a spike toothed harrow, a supporting frame, a plurality of tooth bars pivotally mounted on the frame, an upper curved rearwardly extended flange formed longitudinally of each tooth bar, a rearwardly extended longitudinal flange formed along the lower edge of each bar, the latter flange having spike tooth openings, in which spiked teeth are secured, the upper curved flange covering the upper ends of the spike teeth, and means for holding said tooth bars at an adjusted angle of operation of the spike teeth carried thereby.

2. In a spike toothed harrow, a supporting frame, a plurality of tooth bars pivotally mounted on the frame, an upper curved rearwardly extended flange formed longitudinally of each bar, a lower rearwardly extended flange formed along the lower longitudinal edge of each bar, the latter flange having spike tooth openings, harrow teeth held within the tooth openings, the upper ends of the teeth resting against the rearwardly curved flange, guarding the upper ends of the teeth, and means for holding in adjusted position said bars and teeth carried thereby.

JOHN S. TROYER.